United States Patent [19]
Bunya et al.

[11] Patent Number: 5,647,741
[45] Date of Patent: Jul. 15, 1997

[54] HEAT EXCHANGER FOR COMBUSTION APPARATUS

[75] Inventors: Shunzo Bunya; Hitoshi Kaji; Yasuo Hirose, all of Kanagawa, Japan

[73] Assignees: Chiyoda Corporation; Furnace Techno Co., Ltd., both of Kanagawa-Ken, Japan

[21] Appl. No.: 353,988

[22] Filed: Dec. 6, 1994

[30] Foreign Application Priority Data

Dec. 7, 1993 [JP] Japan .................................. 5-306439
Nov. 29, 1994 [JP] Japan .................................. 6-294761

[51] Int. Cl.[6] ............................................. F27D 17/00
[52] U.S. Cl. ........................ 432/180; 432/159; 432/179; 432/181; 432/182
[58] Field of Search ............................ 432/159, 179, 432/180, 181, 182

[56] References Cited

U.S. PATENT DOCUMENTS

| | | |
|---|---|---|
| 3,756,310 | 9/1973 | Becker . |
| 4,850,862 | 7/1989 | Bjerklie . |
| 4,856,492 | 8/1989 | Kawamoto . |
| 5,275,556 | 1/1994 | Hirose . |

FOREIGN PATENT DOCUMENTS

| | | |
|---|---|---|
| 0 526 172 A2 | 7/1992 | European Pat. Off. . |
| 2 078 916 | 10/1971 | France . |
| 1-159511 | 6/1989 | Japan . |
| 1-222102 | 9/1989 | Japan . |
| 5-256423 | 10/1993 | Japan . |
| 6-11121 | 1/1994 | Japan . |
| 6-241436 | 8/1994 | Japan . |
| 2 208 423 | 5/1987 | United Kingdom . |

*Primary Examiner*—Henry A. Bennett
*Assistant Examiner*—Siddmarth Ohri
*Attorney, Agent, or Firm*—Armstrong, Westerman, Hattori, McLeland & Naughton

[57] ABSTRACT

A heat exchanger for a combustion apparatus capable of providing satisfactory sealing between an open end of an oxidizing agent duct and a regenerative structure. A regenerator includes a high-temperature section constituted by a regenerative unit made of a ceramic material and a low-temperature section constituted by a regenerative unit made of a metal material. The regenerator is formed with a plurality of communication passages which permit a combustion chamber and a suction/exhaust duct structure to communicate with each other. The communication passages are provided by a plurality of through-holes formed in the regenerative units. The number of the through-holes and an equivalent diameter thereof are determined so as to permit a pressure loss gradient in the low-temperature section positioned on the side of the suction/exhaust duct structure to be larger than that in the high-temperature section positioned on the side of the combustion chamber.

20 Claims, 6 Drawing Sheets

HEAT EXCHANGER FOR COMBUSTION APPARATUS

BACKGROUND OF THE INVENTION

This invention relates to a heat exchanger for a combustion apparatus, and more particularly to a heat exchanger for a combustion apparatus which is adapted to heat an air-pervious regenerator by exhaust gas and then preheat an oxidizing agent for combustion by the thus-heated air-pervious regenerator, followed by feeding of the oxidizing agent thus preheated to a combustion chamber.

A heat recovery type combustion apparatus in which a conventional rotary heat exchanger is incorporated is disclosed by way of example in Japanese Patent Application Laid-Open Publication No. 222102/1989. The conventional rotary heat exchanger disclosed is constructed so as to rotate an air-pervious regenerative member or regenerator made of a ceramic material with respect to a suction/exhaust duct structure, to thereby carry out heat exchange. Also, the conventional heat exchanger is constructed so as to provide an air passage for guiding air acting as an oxidizing agent to a combustion chamber in an exhaust passage for guiding exhaust gas discharged from the combustion chamber and terminate a part of a partition for partitioning the air passage and exhaust passage from each other at a position apart from the air-pervious regenerator, to thereby permit the air passage and exhaust passage to partially communicate with each other. Unfortunately, partial communication between the air passage and the exhaust passage causes fluid to flow from a high-pressure fluid side through a communication section therebetween into a low-pressure fluid side, so that the heat exchanger requires to employ a forced draft fan for feeding combustion air to an air duct and an induced-draft fan for drawing exhaust gas out of an exhaust duct which are increased in capacity in view of such flowing of fluid into the low-pressure fluid side. Also, this fails to permit the heat exchanger to be increased in heat transfer efficiency and heat recovery, leading to a failure to satisfactorily increase energy saving of the heat exchanger. In view of the problem, the assignee proposed techniques wherein a seal structure is provided between an open end of an air duct and an air-pervious regenerator to minimize leakage of combustion air from an air passage to an exhaust passage, to thereby permit both a forced draft fan for feeding of combustion air and an induced-draft fan for suction of exhaust gas to be decreased in capacity.

Such a conventional rotary heat exchanger as described above is likewise disclosed in Japanese Patent Application Laid-Open Publication No. 241436/1994, U.S. Pat. No. 5,275,556, U.K. Patent Application Publication No. 2,208,423 and the like.

Another conventional heat exchanger for a combustion apparatus is proposed which is constructed so as to heat an air-pervious generator by means of exhaust gas and then preheat air by the regenerator thus heated while keeping the regenerator and a duct from being rotated, as disclosed in Japanese Patent Application Laid-Open Publication No. 256423/1993, Japanese Patent Application Laid-Open Publication No. 11121/1994, U.S. Pat. No. 4,865,492 and the like. Also, the heat exchanger proposed is constructed in such a manner that the air-pervious regenerator is arranged between a combustion chamber and each of two suction/exhaust ducts or in the middle of each of the suction/exhaust ducts. Also, at least one reversing valve is provided for the two suction and exhaust ducts. Changing-over or reversing of the reversing valve permits the two suction/exhaust ducts to alternately function as an air duct and an exhaust duct, respectively.

Of the conventional heat exchangers described above, the former fails to provide satisfactory sealing between the open end of the air duct and the air-pervious regenerator irrespective of arrangement of the seal structure therebetween, because the air-pervious regenerator is formed with a number of through-holes.

The latter would be improved in sealing characteristics as compared with the former. Nevertheless, in the latter, it was found that leakage of air occurs in the reversing valve kept closed. FIG. 8 schematically shows reversing of the two suction/exhaust ducts by means of a four-direction reversing valve, wherein reference numeral 101 designates a combustion chamber, 102 and 103 each are a duct, 104 and 105 each are an air-pervious regenerator, and 106 is a four-direction reversing valve. When a valve body 107 of the four-direction reversing valve 106 is rotated by an angle of 90 degrees in a clockwise direction from a position shown in FIG. 8, the ducts 102 and 103 are permitted to function as an air duct and an exhaust duct, respectively. For example, flowing of air through the duct 102 causes a low-temperature end difference pressure which is a difference in pressure between an air pressure on an inlet side of the air-pervious regenerator 104 and an exhaust pressure on an outlet side of the sir-pervious regenerator 105 to be applied to the valve body 107. Thus, in order to actuate or operate the valve body 107, driving force is required which is proportional to a product of the low-temperature end difference pressure and a flow rate of fluid flowing through the valve. However, the reversing valve is reversed many times during operation of the combustion apparatus, so that even a slight decrease in driving force for the valve body 107 leads to a reduction in cost for operation of the heat exchanger and an improvement in durability of the reversing valve. Also, use of the reversing valve generally comprising a butterfly valve fails to fully prevent air leakage, which is proportional to a root of the low-temperature end differential pressure. In order to avoid a decrease in thermal recovery and effectiveness of the heat exchanger, it is required to increase the low-temperature end differential pressure. Unfortunately, an increase in low-temperature end differential pressure causes air leakage to be increased, so that it is required to excessively large-size the forced and inducted-draft fan and ducts to be incorporated in the heat exchanger.

SUMMARY OF THE INVENTION

The present invention has been made in view of the foregoing disadvantages of the prior art.

Accordingly, it is an object of the present invention to provide a heat exchanger for a combustion apparatus which is capable of exhibiting increased sealing characteristics while minimizing a decrease in effectiveness of the heat exchanger.

It is another object of the present invention to provide a heat exchanger for a combustion apparatus which is capable of reducing a low-temperature end differential pressure while minimizing a decrease in effectiveness of the heat exchanger.

It is a further object of the present invention to provide a heat exchanger for a combustion apparatus which is capable of ensuring satisfactory sealing between an open end of a duct for an oxidizing agent and an air-pervious regenerator while minimizing a decrease in effectiveness of the heat exchanger.

It is still another object of the present invention to provide a heat exchanger for a combustion apparatus which is capable of reducing driving force for a reversing valve while minimizing a decrease in effectiveness of the heat exchanger.

It is yet another object of the present invention to provide a heat exchanger for a combustion apparatus which is capable of facilitating replacement, maintenance and inspection of an air-pervious regenerator exposed to an elevated temperature.

It is even another object of the present invention to provide a heat exchanger for a combustion apparatus which is capable of preventing deterioration of sealing characteristics of the heat exchanger even when any error occurs in assembling of the heat exchanger.

It is a still further object of the present invention to provide a heat exchanger for a combustion apparatus which is capable of minimizing wearing of a seal member for providing sealing between an oxidizing agent passage and an exhaust passage.

It is a yet further object of the present invention to provide an air-pervious regenerator for a heat exchanger which is capable of being readily manufactured and exhibiting desired characteristics.

The present invention may be applicable to both a rotary heat exchanger for a combustion apparatus disclosed in Japanese Patent Application Laid-Open Publication No. 222102/1989 or the like and a non-rotary heat exchanger for a combustion apparatus disclosed in Japanese Patent Application Laid-Open Publication No. 256423/1993 or the like.

In the present invention, a regenerator is so constructed that a pressure loss gradient in a low-temperature section positioned on the side of suction/exhaust ducts is permitted to be larger than that in a high-temperature section positioned on the side of a combustion chamber. The terms "low-temperature block" or "low-temperature section" and "high-temperature block" or "high-temperature section" used herein indicate a section of the regenerator defined on the side of a suction/exhaust duct structure and a section thereof defined on the side of the combustion chamber. A length of each of the sections is varied depending on characteristics desired. When the regenerator is integrally made of a ceramic or metal material, both sections are likewise formed integrally with each other.

When the low-temperature section and high-temperature section are formed separately from each other, each of the sections may comprise at least one regenerative unit. In this instance, the low-temperature section and high-temperature section each may be made of a ceramic material or a metal material. Alternatively, a regenerative unit made of a ceramic material and that made of a metal material may be combined together for the regenerator.

The sections of the regenerator may be provided with air perviousness in any desired manner. For this purpose, the regenerator may be formed with a number of through-holes, resulting in communication passages being provided. The through-holes constituting a part of the communication passages may be formed into any desired configuration such as a circle or a polygonal shade like a triangle or a rectangle.

A pressure loss gradient in each of the sections is defined to be a pressure loss per a unit length of the section. When the through-holes are formed for the purpose of providing the regenerator with air perviousness, a pressure loss gradient in each of the sections may be desirably determined by suitably setting the number of through-holes (meshes), a configuration of the through-holes, a dimension thereof, a thickness of a partition between the through-holes and the like.

The whole regenerator or one of the high-temperature section and low-temperature section may be constructed in any desired manner. For example, a laminate of flat strip-like steel plates and corrugated strip-like steel plates is wound to provide at least one of the high-temperature section and low-temperature section of the regenerator. The flat strip-like steel plates and corrugated strip-like steel plates are preferably previously joined to each other.

Alternatively, at least one of the high-temperature section and low-temperature section may be formed by calcining a green regenerator element made by winding a laminate of flat strip-like ceramic paper sheets and corrugated strip-like ceramic paper sheets.

A pressure loss gradient in each of the sections may be desirably varied by varying a configuration of the through-holes, a dimension thereof and/or a thickness of the partition between the through-holes as desired.

A heat exchanger for a combustion apparatus according to the present invention may generally comprise a suction/exhaust duct structure, a regenerative structure, a seal structure and a rotation mechanism. The suction/exhaust duct structure includes an oxidizing agent duct arranged so as to surround an oxidizing agent passage for guiding an oxidizing agent such as air or the like to a combustion chamber and an exhaust duct arranged so as to surround an exhaust passage for guiding exhaust gas discharged from the combustion chamber. The regenerative structure includes a regenerator exhibiting air perviousness which permits the combustion chamber and the oxidizing agent passage and exhaust passage of the suction/exhaust duct structure to communicate with each other through the regenerator and is mounted on a wall defining the combustion chamber. The seal structure is arranged between an open end of the oxidizing agent duct of the suction/exhaust duct structure and the regenerative structure to minimize or restrain air leakage from the oxidizing agent passage to the exhaust passage. The rotation mechanism functions to drive at least one of the suction/exhaust duct structure and regenerative structure to cause relative rotary motion between the oxidizing agent passage and exhaust passage of the suction/exhaust duct structure and the regenerative structure. When the present invention is applied to the rotary heat exchanger constructed as described above, the regenerator is constructed so as to permit a pressure loss gradient in a low-temperature section defined on the side of the suction/exhaust duct structure to be larger than that in a high-temperature section defined on the side of the combustion chamber.

A seal member biasing mechanism for biasing a seal member of the seal structure toward the regenerator may be arranged at the open end of the oxidizing agent duct. The biasing mechanism may comprise a bellow constructed so as to exhibit elasticity in an axial direction of the oxidizing agent duct.

The oxidizing agent duct may partially comprise a bellow exhibiting elasticity in an axial direction thereof.

The present invention may be applicable to a non-rotary heat exchanger for a combustion apparatus as well. A non-rotary heat exchanger for a combustion apparatus according to the present invention includes at least one reversing valve, suction/exhaust ducts for alternately carrying out feed of an oxidizing agent and discharge of exhaust gas by reversing operation of the reversing valve and a regenerator arranged between each of the suction/exhaust ducts and a combustion chamber or in each of the suction/exhaust ducts. The regenerators each include a low-temperature section arranged on the side of the suction/exhaust ducts and a high-temperature section arranged on the side of the combustion chamber and are constructed so as to permit a pressure loss gradient in the low-temperature section to be larger than that in the high-temperature section.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a heat exchanger for a combustion apparatus according to the present invention will be described hereinafter with reference to the accompanying drawings.

Figure 1:
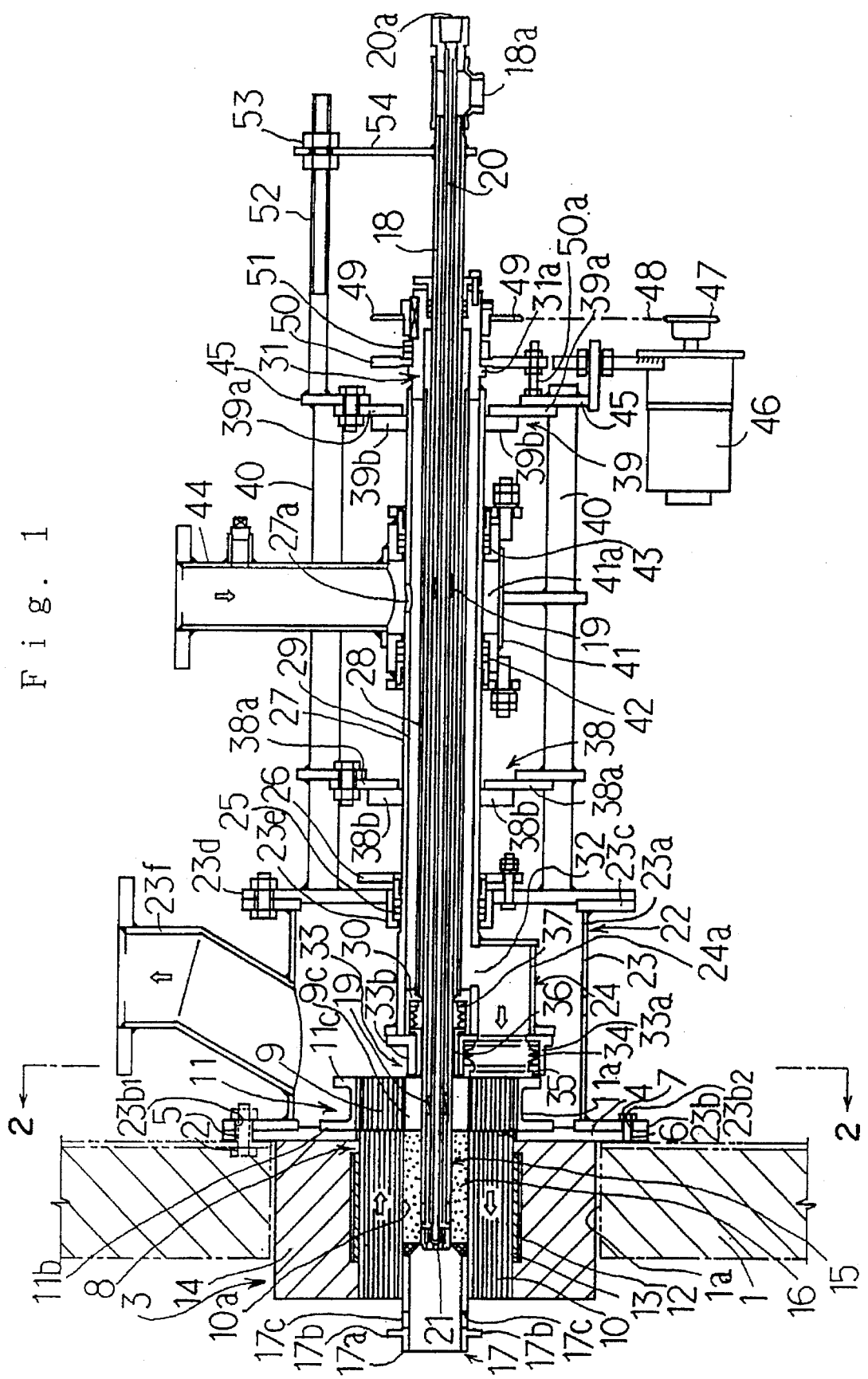
FIG. 1 is a sectional view showing an embodiment of a heat exchanger for a combustion apparatus according to the present invention which is applied to a burner arranged in an industrial furnace.
Figure 2:
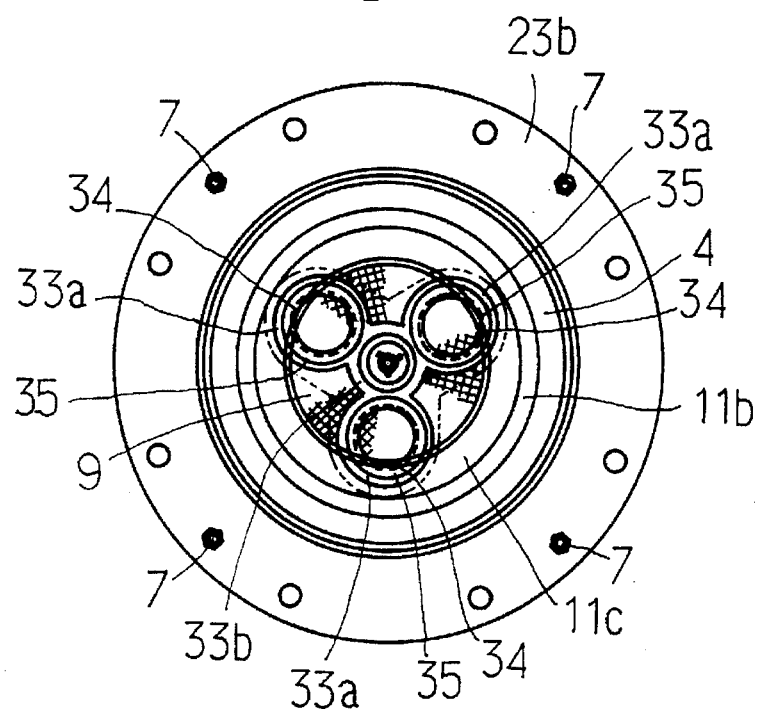
FIG. 2 is a sectional view taken along line 2—2 of FIG. 1.

Referring first to FIGS. 1 and 2, an embodiment of a heat exchanger for a combustion apparatus according to the present invention is illustrated, which is applied to a burner installed in an industrial furnace. A heat exchanger of the illustrated embodiment generally designated at reference numeral 3 is in the form of a rotary heat exchanger. In FIG. 1, reference numeral 1 designates a wall of an industrial furnace, which is formed with a mounting opening 1a through which the heat exchanger is mounted on the wall 1. The wall 1 has a plurality of mounting bolts 2 embedded therein at predetermined intervals in a circumferential direction thereof in a manner to surround the mounting opening 1a. The mounting bolts 2 are mounted thereon with a mounting plate 4 through a plurality of through-holes 5 formed therethrough. The mounting plate 2 is made of metal and fittedly mounted with the heat exchanger 3. Also, the mounting plate 4 is formed into an annular shape and provided a plurality of threaded holes 5 together with the above-described through-holes 5 in a manner to be positioned in proximity to an outer periphery thereof and spaced from each other at predetermined intervals in the circumferential direction. In each of the threaded holes 6 is threadedly fitted a bolt 7 for fixing a suction/exhaust duct structure 22.

The mounting plate 4 is fixedly mounted on a surface thereof facing the suction/exhaust duct structure 22 with a fixture 11 by means of a fixing means (not shown) which may comprise a combination of a bolt and a nut. The fixture 11 is made of metal and functions to fix a regenerative unit 9 constituting a low-temperature block or section of a regenerator 8 on the mounting plate 4 therethrough. Also, the mounting plate 4 is fixedly mounted on a surface thereof facing a combustion chamber with a fixture 12 by means of a fixing means (not shown) which may likewise comprise a combination of a bolt and a nut. The fixture 11 is made of metal and functions to fix a regenerative unit 10 constituting a high-temperature block or section of the regenerator 8 on the mounting plate 4 therethrough. The fixture 11 includes a cylindrical portion 11a and flange portions 11b and 11c provided on either side of the cylindrical portion 11a. The flange portion 11b is formed with a plurality of through-holes (not shown) via which bolts are inserted. The flange portion 11c has an outer end formed so as to have a smooth surface sufficient to provide a seal section due to contact with a seal member described hereinafter. The fixture 12 includes a cylindrical ring portion which is provided on an outer periphery thereof with a plurality of mounting elements (not shown) formed with a plurality of holes through which bolts are inserted. Into the mounting elements are inserted bolts each having one end welded to the mounting plate 4, which are threadedly fitted on nuts, to thereby fix the fixture 12 on the mounting plate 14.

Figure 3A:
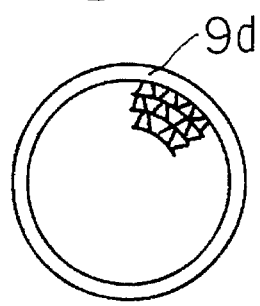
FIG. 3(A) is a schematic front elevation view showing a regenerative unit made of a metal material.
Figure 3B:
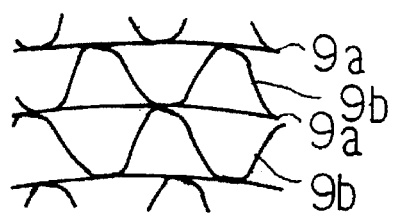
FIG. 3(B) is an enlarged view showing an essential part of the regenerative unit of FIG. 3(A)

In the illustrated embodiment, the regenerative unit 9 constituting the low-temperature section is made of a metal material and constructed as shown in FIGS. 3(A) and 3(B). More particularly, the regenerative unit 9, as shown in an enlarged manner in FIG. 3(B), is formed into a spiral shape by winding a laminate comprising flat strip-like steel plates 9a and corrugated strip-like steel plates 9b superposed on each other on a cylindrical spool 9c (FIG. 1). A plurality of through-holes defined between the strip-like steel plates 9a and the corrugated strip-like steel plates 9b to form a part of a plurality of communication passages each are formed into substantially U-like and inverted U-like shapes in cross section in an alternate manner in a circumferential direction of the regenerative unit 9, respectively. The words "cross section" used herein indicate a section taken in a direction perpendicular to an axial or longitudinal direction of the regenerative unit 9. Manufacturing of the regenerative unit 9 is facilitated by previously joining the strip-like steel plates 9a and 9b to each other by welding or the like. The regenerative unit 9 is fittedly mounted on an outer periphery thereof with a ring-like jacket 9d. The strip-like steel plates 9a and 9b each are made of a heat resistant and corrosion resistant steel material such as, for example, SUS 304, SUS 430, SUS 310, SUS 180 or the like.

The regenerative unit 10 constituting the high-temperature section includes a ceramic regenerative body made of a ceramic paper sheet material. The regenerative unit 10 may be constructed in substantially the same manner as the above-described regenerative unit 9 constituting the low-temperature side section. The regenerative unit 10 is made by winding a laminate comprising flat strip-like ceramic paper sheets and corrugated strip-like paper sheets superposed on each other on a cylindrical spool, to thereby a green regenerator element. Then, the green regenerator element is subject to calcination, resulting in the ceramic regenerative unit 10 being provided. Alternatively, the ceramic regenerative unit 10 may be formed by extrusion molding known in the art. The regenerative unit 10 is formed at a central portion thereof with an axially extending through-hole 10a of substantially the same diameter as an outer diameter of the spool 9c. Also, the regenerative unit 10 is formed with a plurality of through-holes, which form a part of a plurality of communication passage of the regenerative unit 10. The through-holes are formed into substantially U-like and inverted U-like shapes or substantially triangular and inverted triangular shapes in cross section in an alternate manner in a circumferential direction of the regenerative unit 10, respectively. A ceramic material for the regenerative unit 10 may include an oxide material such as cordierite, mullite, zirconium mullite, zirconia, high alumina or the like and a non-oxide material such as silicon carbide, silicon nitride, titanium carbide, hafnium carbide, tantalum carbide or the like.

Reference numeral 13 designates a cushioning member 13 made of a heat-resistant and thermally expandable ceramic-fiber composite material and arranged between an outer periphery of the regenerative unit 10 and the fixture 12, to thereby prevent damage top the regenerative unit 10 during fixing of the regenerative unit 10 on the fixture 12. The ceramic-fiber composite material for the cushioning material includes Pillar Mat (tradename) and the like. In the illustrated embodiment, the mounting plate 4, the cushioning member 13 and the parts arranged between the plate 4 and the member 13 cooperate with each other to form a regenerative structure.

Also, the illustrated embodiment is so constructed that a plurality of the communication passages defined in the regenerator 8 through which the combustion chamber communicates with an air passage acting as an oxidizing agent passage and an exhaust passage defined in the suction/exhaust duct structure 22 permit a pressure loss gradient in the low-temperature section or regenerative unit 9 located on the side of the suction/exhaust duct structure 22 to be increased as compared with that in the high-temperature section or regenerative unit 10. Such construction will be detailedly described hereinafter.

The regenerative unit 10 and fixture 12 are commonly provided on an outer periphery thereof with a refractory member 14 made of a ceramic fiber material or a castable material. The central through-hole of the spool 9c of the regenerative unit 9 and the through-hole 10a of the regenerative unit 10 are commonly provided therein with a cylinder 16 made of a ceramic fiber material, in which a burner nozzle 15 is inserted at a distal end thereof in such a manner that a slight gap which permits movement of the burner nozzle 15 in an axial direction thereof is defined therebetween. The cylinder 16 is mounted on a distal end thereof with a burner hood 17 made of a ceramic material. The burner hood 17 functions to stabilize a flame injected from the distal end of the burner nozzle 15 to prevent it from returning directly to the regenerative unit 10. The burner hood 17 includes a cylindrical portion 17a and an annular collar 17b formed on the cylindrical portion 17 in a manner to be radially outwardly projected therefrom and extend in a circumferential direction thereof. Also, the burner hood 17 is provided with a plurality of through-holes 17c, which are arranged in a manner to be spaced from each other in a peripheral direction of the burner hood 17 between the collar 17b and the regenerative unit 10. The collar 17b functions to prevent a flame injected from the burner nozzle 15 from returning directly to the side of the regenerative unit 10 and the through-holes 17c function to introduce a part of preheated air striking on the collar 17b into the burner hood 17, to thereby ensure combustion in the burner hood 17.

The burner nozzle 15 includes a fuel pipe 18 in which a motive air pipe 20 is arranged through a spacer 19 in a manner to be concentric with the fuel pipe 18 and which is mounted on a distal or forward end thereof with a burner tip 21. The fuel pipe 18 is provided at a rear end thereof with a fuel inlet 18a and the motive air pipe 20 is provided at a rear end thereof with a motive air inlet 20a. The motive air pipe 20a is fed with air acting as an oxidizing agent. Also, it may be fed with steam.

The mounting plate 4 is mounted thereon with the suction/exhaust duct structure 22 constituting a part of suction/exhaust ducts. The suction/exhaust duct structure 22 includes an exhaust duct 23 and an air duct 24 acting as an oxidizing agent duct rotatably arranged in an internal space defined in the exhaust duct 23. The exhaust duct 23 includes a duct body 23a of a cylindrical shape and flanges 23b and 23c provided on either side of the duct body 23a. The flange 23b is formed with a plurality of through-holes 23b1 through which the mounting bolts 2 extending through the mounting plate 4 are inserted and a plurality of through-holes 23b2 which are formed in alignment with the threaded holes 6 of the mounting plate 4 and through which the bolts 7 are inserted. The flange 23c has an end plate 23d fixed thereon by means of bolts. The end plate 23d is formed at a central portion thereof with a packing receiving portion 23e for receiving a gland packing 25 therein. Reference numeral 26 designates a packing holding plate for holding the gland packing 25 in the packing receiving portion 23e. The plate 26 is bolted to the end plate 23d. The duct body 23a is provided with an exhaust outlet 23f, which is connected through a pipe (not shown) to an induced-draft fan.

Reference numeral 27 designates an outer nozzle cylinder inserted into the exhaust passage in the exhaust duct 23 while being kept sealed, which is mounted on a distal end thereof with the air duct 24. The outer nozzle cylinder 27 is provided therein with an inner nozzle cylinder 28 in a manner to be concentric therewith, so that an air feed passage 29 is defined between the outer nozzle cylinder 27 and the inner nozzle cylinder 28. The outer nozzle cylinder 27 is fixedly mounted at a distal or front end thereof with a cylindrical stopper member 30, to which one end of the inner nozzle cylinder 28 is joined by welding. The outer nozzle cylinder 27 has an end cap 31 fixed to a rear end thereof, to which the other end of the inner nozzle cylinder 28 is connected by welding. Also, the outer nozzle cylinder 27 is formed at the distal end thereof with three communication holes 32 in a manner to be spaced from each other by angular intervals of 120 degrees in a circumferential direction thereof. In FIG. 1, only one such communication hole 32 is shown for the sake of brevity. The air duct 24 comprises three air duct sections 24a arranged in a manner to be split from each other and in correspondence to the three communication holes 32. The air duct sections 24a each have an air nozzle 33 fixed to a distal end thereof.

The air nozzle 33 includes three cylindrical portions 33a arranged in correspondence to each of the air duct sections 24a and a connection portion 33b for connecting the cylindrical portions 33a to each other therethrough. The cylindrical portions 33a each have a bellows 34 of a cylindrical shape arranged therein. The bellows 34 is fixedly mounted at one end thereof on an open end of the air duct portion 24a.

The bellows 34 has an annular seal member 35 fixed at a distal end thereof. The seal member 35 is adapted to be rotated while being contacted with an end surface of the regenerative unit 9, therefore, it may be made of a metal material exhibiting increased mechanical strength. In the illustrated embodiment, the seal member 35 is made of carbon steel and cooperates with the bellows 34 to constitute a seal structure.

The above-described construction of the illustrated embodiment wherein the three split air duct sections 24a are arranged at angular intervals of 120 degrees increases effectiveness of the heat exchanger as compared with arrangement of a single air duct. In particular, the illustrated embodiment is so constructed that the seal member 35 is contacted at a part thereof with the flange 11c of the fixture 11, to thereby permit the split air duct sections 24a to exhibit functions thereof to a maximum degree.

The bellows 34 is constructed so as to exhibit elasticity and flexibility in an axial direction thereof, resulting in one end thereof being flexibly movable while being kept stationary at the other end thereof. In the illustrated embodiment, a bellows commercially available may be conveniently used for this purpose. The bellows 34 is arranged between the regenerative unit 9 and the open end of the split air duct sections 24a while being compressed, so that even when an axis of the regenerative unit 9 and that of the split air duct sections 24a fail to be rendered parallel to each other due to a slight error in mounting of the regenerative unit 9, the bellows is permitted to be deformed due to its elasticity and flexibility to closely contact the seal member 35 with the end surface of the regenerative unit 9. Thus, it will be noted that such construction effectively prevent the above-described error from deteriorating seal performance of the seal member.

The spool 9c of the regenerative unit 9 has an end to which a seal fixing cylindrical member 36 is fixed at one end thereof. The cylindrical member 36 is arranged so as to extend at the one end thereof into the connection portion 33b of the air nozzle 33 and terminate at the other end thereof in the cylindrical stopper member 30. The cylindrical member 36 is formed at the other end thereof with a flange, to which a seal member 37 comprising a metal bellows is fixed at one end thereof. The seal member 37 is contacted with the flange of the stopper member 30 to prevent exhaust gas which enters the stopper member 30 along the burner nozzle 15 from leaking through a gap between the connection portion 33b of the air nozzle 33 and the cylindrical member 36. The heat exchange free of the seal member 37 causes combustion gas of an elevated temperature in the furnace to enter between the fuel pipe 18 and the cylinder 16 made of a ceramic fiber material, resulting in a possibility of damage to the pipe 18 due to the combustion gas. The seal member 37 functions to absorb an error occurring during the assembling in substantially the same manner as the seal member 34.

The heat exchanger of the illustrated embodiment further includes rotation support mechanisms 38 and 39 for rotatably supporting the outer nozzle cylinder 27. The rotation support mechanisms 38 and 39 are fixedly supported on four rods 40 mounted on the end plate 23d of the exhaust duct 23 so as to surround the outer nozzle cylinder 27. The rods 40 are arranged so as to define a square by cooperation with each other and the outer nozzle cylinder 27 is positioned at a center of the square. The rotation support mechanisms 38 and 39 includes rollers 38a and 38b mounted on four arms 38a and 39a, respectively. The arms 38a and 39a each are fixed at a proximal end thereof on each of the rods 40 and extend at a distal end thereof toward the outer nozzle cylinder 27 and the rotation rollers each are fixed at the distal end of each of the arms.

The outer nozzle cylinder 27 is formed at a portion thereof positioned between the rotation support mechanisms 38 and 39 with at least one air inlet 27a through which combustion air is introduced into the cylinder 27. A packing holding member 41 is arranged so as to surround the above-described portion of the outer nozzle cylinder 27 between the rotation support mechanisms 38 and 39. The packing holding member 41 is provided therein with two packings 42 and 43, which are positioned on either side of the air inlet 27a for keeping an air inlet space 41a formed around the air inlet 27a air-tight. The outer nozzle cylinder 27 is rotated in the packing holding member 41 and the packing holding member 41 is fixedly mounted on two of the rods 40. The packing holding member 41 is fixedly mounted thereon with an air intake cylinder 44 communicating with the air inlet space 41a. To the air intake cylinder 44 is connected one end of a pipe (not shown), which is then connected at the other end thereof to an induced-draft fan.

The four rods 40 are commonly mounted at an end thereof with a mounting plate 45, which is mounted at a lower end thereof with a driving motor 46. The motor 46 includes an output shaft which is mounted thereon with a sprocket 47. The sprocket 47 has a chain 48 wound thereon, which is then wound on a sprocket 49 fixed on an end cap 31 fitted on an end of the outer nozzle cylinder 27. Thus, driving of the motor permits driving force thereof to be transmitted to the outer nozzle cylinder 27, resulting in the outer nozzle cylinder 27 being rotated. In the illustrated embodiment, the motor 46, sprockets 47 and 49, chain 48, and rotation support mechanisms 38 and 39 cooperate with each other to provide a rotation mechanism which permits relative rotary motion to occur between the air passage or oxidizing agent passage and exhaust passage of the suction/exhaust duct mechanism 22 and the regenerative mechanism. The end cap 31 has a stopper member 50 loosely fitted thereon. The stopper member 50 is arranged between an annular projection 31a provided on an outer periphery of the end cap 31 and a stopper ring 51 fixedly fitted on the end cap 31 and is provided at a distal end thereof with an abutment member 50a, which is abutted against a corresponding abutment provided on the mounting member 4, to thereby regulate or limit movement of the outer nozzle cylinder 27 toward the regenerator.

The mounting plate 45 is fixedly mounted at a center of an upper portion thereof with a threaded rod 52 which is formed at a distal end thereof with threads. The rod 52 is arranged so as to extend in parallel to the burner nozzle 15 and threadedly fitted thereon with a threaded member 53. The threaded member 53 is rotatably held at one end of an arm member 54 which is fixedly mounted at the other end thereof on the fuel pipe 18 of the burner nozzle 15. Rotation of the threaded member 53 permits a position of the burner nozzle 15 in an axial direction thereof to be adjusted. In the illustrated embodiment, the rod 52, threaded member 53 and arm member 54 cooperate with each other to provide a position adjustment mechanism for the burner nozzle.

Now, the manner of operation of the heat exchanger of the illustrated embodiment constructed as described above will be described hereinafter.

First, combustion air is fed from the air duct 24 through the communication passages of the regenerator 8 to the combustion chamber while keeping the burner ignited. The combustion air fed to the combustion chamber is then mixed with fuel injected from the burner nozzle 15, to thereby form a flame. The combustion air is heated by exhaust gas while passing through the communication passages of the regenerator 8. During combustion, the air duct 24 is kept rotated at a predetermined rotational speed through the motor 46. More specifically, the air duct 24 is kept rotated at a rotational speed of 2 r.p.m. or more. A portion of the regenerator 8 which is reduced in temperature due to rotation of the air duct 24 is heated again by exhaust gas flowing from the combustion chamber to the exhaust duct 23.

Now, construction and characteristics of the regenerator will be described hereinafter. In order to facilitate the understanding, a conventional regenerator made of a ceramic material will be first described.

Figure 6:
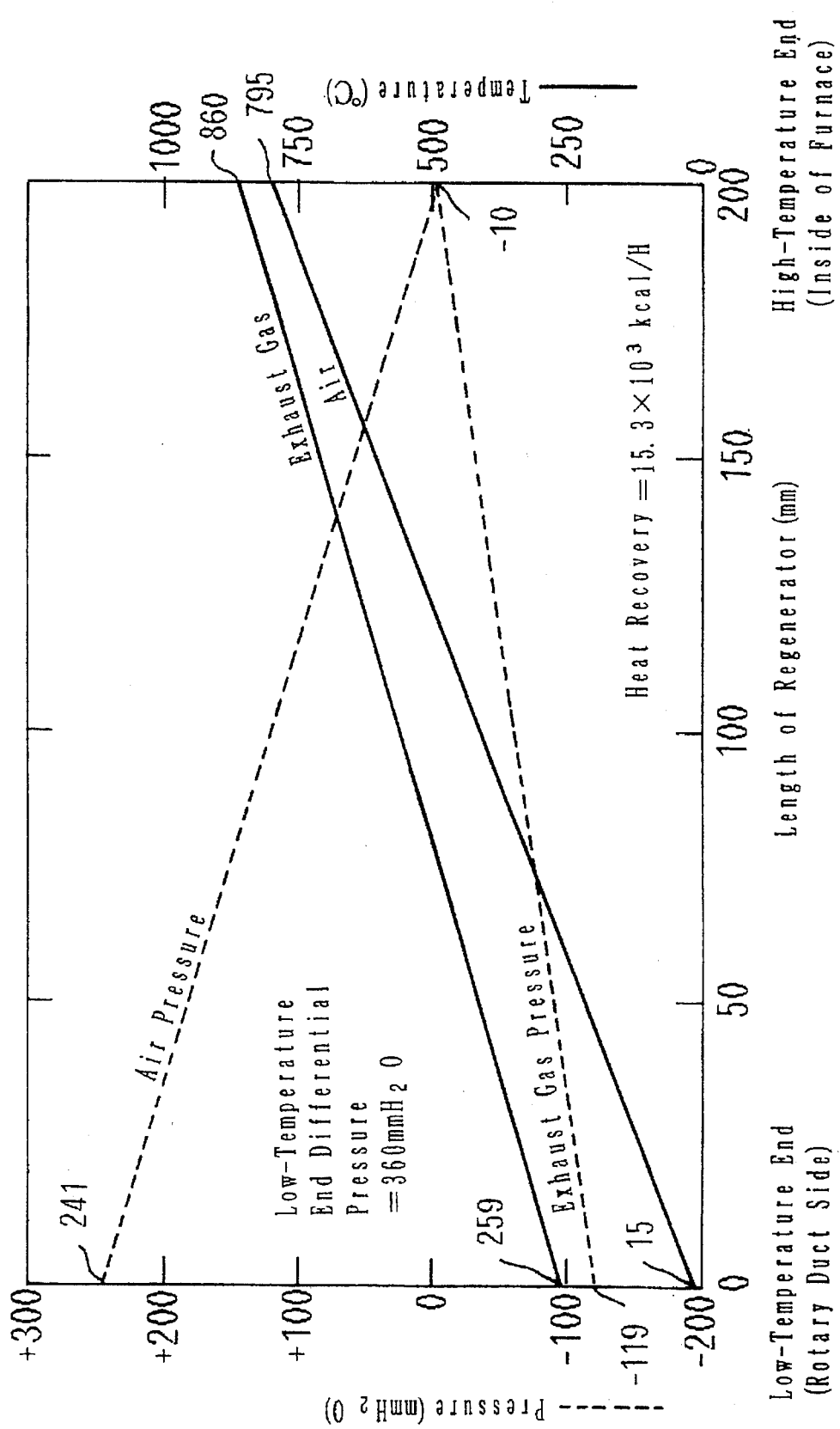
FIG. 6 is a graphical representation showing a variation of each of an air pressure, an exhaust gas pressure, an air temperature and an exhaust gas temperature in a regenerator constituted by only regenerative units made of a ceramic material, which variation was obtained by calculation.

A conventional ceramic regenerator is wholly made of the same ceramic material and constructed into a homogeneous structure wherein a plurality of communication holes are formed into the same configuration in cross section in an axial direction thereon. The conventional regenerator of such a homogeneous structure generally exhibits such a temperature and pressure profile as shown in FIG. 6. The regenerator is formed of cordierite into dimensions of 144 mm in outer diameter thereof, 90 mm in effective inner diameter thereof, 20 mm in length thereof in an axial direction thereof and 1.45 mm in equivalent diameter of the through-holes. Also, it is formed with 3900 through-holes. The equivalent diameter d of the through-holes is defined to be $d=4S/L$, wherein S is a sectional area of each of the through-holes in a direction perpendicular to a longitudinal direction thereof and L is a length of a circumference of the through-hole defined in the direction perpendicular to the longitudinal direction thereof. Supposing that a cross sectional configuration of the through-hole is a circle of a in diameter, the equivalent diameter is $d=4(a^2/4)/a=a$. When the through-hole has a square of a in one side in cross section, the equivalent diameter is $d=4/a^2/4a=a$. An oxidizing agent used is air.

As will be noted from FIG. 6, an air pressure and an exhaust gas pressure, as well as an air temperature and an exhaust gas temperature each are linearly varied at a substantially constant gradient in the regenerator. As a low-temperature end differential pressure which is a difference between an air pressure and an exhaust gas pressure on the end side of the suction/exhaust duct structure or on the low-temperature end side is decrease, leakage of air form the air passage or oxidizing agent passage to the exhaust passage is decreased. Therefore, when only the air leakage is considered, it is desired that the low-temperature end differential pressure is reduced as much as possible. However, a rate of transfer of heat from the regenerator to air is determined depending on a quality of heat obtained by adding the amount of heat transferred by convection and that by radiation to each other, therefore, a mere increase in equivalent diameter of the communication passages of the regenerator or a mere increase in the number of communication passages leads to deterioration in effectiveness of the heat exchanger.

In view of the above, the inventors made a study on a decrease in low-temperature end differential pressure while minimizing a reduction in effectiveness of the heat exchanger. As a result, it was found that suitable setting of both the number of communication passages in the regenerator and an equivalent diameter of the communication passages to set a pressure loss gradient in the regenerator at a suitable value permits a decrease in low-temperature end differential pressure to be theoretically carried out without substantially deteriorating effectiveness of the heat exchanger. However, in actual manufacturing of the regenerator, facilities and a material for manufacturing of the regenerator are subject to restriction, therefore, it is highly troublesome and difficult to produce the regenerator satisfactorily exhibiting a pressure loss gradient within a desired range while specifying whole dimensions of the regenerator. In view of the disadvantage, the inventors further made a study on whether a modification of a part of the regenerator while keeping whole dimensions of the regenerator unvaried leads to a decrease in low-temperature end differential pressure without substantially deteriorating effectiveness of the heat exchanger. For this purpose, first the regenerator was partitioned into the low-temperature section positioned on the side of the suction/exhaust duct structure and the high-temperature section positioned on the side of the combustion chamber and then an equivalent diameter of the through-holes constituting the communication passages in each of both sections and the number of such through-holes were varied. As a result, it was found that formation of the communication passages which permits a pressure loss gradient in the low-temperature section on the side of the suction/exhaust duct structure to be larger than that in the high-temperature section on the side of the combustion chamber permits the low-temperature end differential pressure to be reduced while keeping whole dimensions of the regenerator unvaried and minimizing effectiveness of the heat exchanger.

In view of the foregoing, the regenerative unit 10 constituting the high-temperature section of the regenerator of the illustrated embodiment was made of cordierite so as to exhibit a combustion capacity of 100,000 kcal/hr. The regenerative unit 10 formed has dimensions of 144 mm in outer diameter thereof, 90 mm in effective inner diameter thereof, 150 mm in length thereof in an axial direction thereof, 2.54 mm in equivalent diameter of the through-holes and 11.5 $cm^2/cm^3$ in effective surface area thereof. Also, the through-holes formed were 1,430 in number. The regenerative unit 9 constituting the low-temperature section was formed of a SUS 430 steel plate into dimensions of 144 mm in diameter thereof, 90 mm in effective inner diameter thereof, 50 mm in length thereof in an axial direction thereof, 1.52 mm in equivalent diameter of the through-holes and 26.4 $cm^2/cm^3$ in effective surface area thereof. The through-holes formed were 3,500 in number and a rate of formation of the through-holes was 91.7%.

Figure 4:
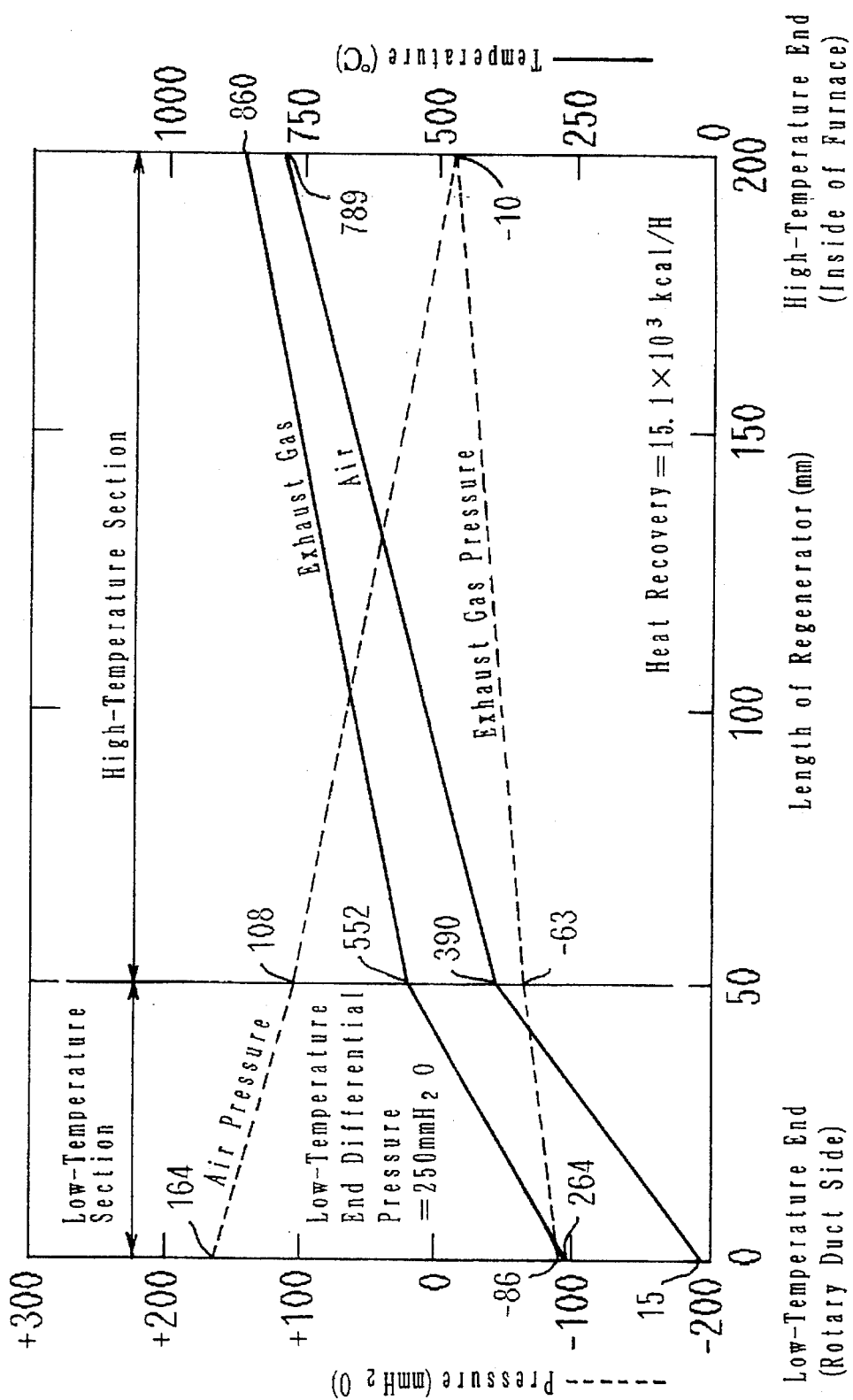
FIG. 4 is a graphical representation showing a variation of each of an air pressure, an exhaust gas pressure, an air temperature and an exhaust gas temperature in a regenerator incorporated in the heat exchanger shown in FIG. 1, which was obtained by calculation.

Theoretical calculation of the regenerator 8 thus formed was carried out under the conditions that a combustion rate is 53,000 kcal/hr, LPG is used as fuel, a furnace temperature is 860° C., a furnace pressure is $-10$ $mmH_2O$, a temperature of air fed is 15° C., an excessive air ratio is 10%, the amount of motive air is 8% of a theoretical air quantity and a ratio of a sectional area of the exhaust passage to a whole sectional area of the regenerator is 67%, resulting in a variation in each of an air pressure, an exhaust gas pressure, an air temperature and an exhaust gas temperature in the regenerator 8 being obtained. The results were as shown in FIG. 4. Also, FIG. 6 shows a temperature and pressure profile of the conventional regenerator.

As will be noted from comparison between FIGS. 4 and 6, the regenerator 8 of the illustrated embodiment restrains a decrease in thermal recovery to a level as low as 1.3% and permits the low-temperature end differential pressure which is a difference between an air pressure and an exhaust pressure on the low-temperature end side of the regenerator 8 to be reduced by 44%. Thus, the illustrated embodiment substantially reduces the low-temperature end differential pressure to minimize air leakage from the air passage to the exhaust passage, although it somewhat deteriorates effectiveness of the heat exchanger within an allowable range. An experiment which was made by the inventors indicated substantially the same results as by the theoretical calculation described above.

Figure 5:
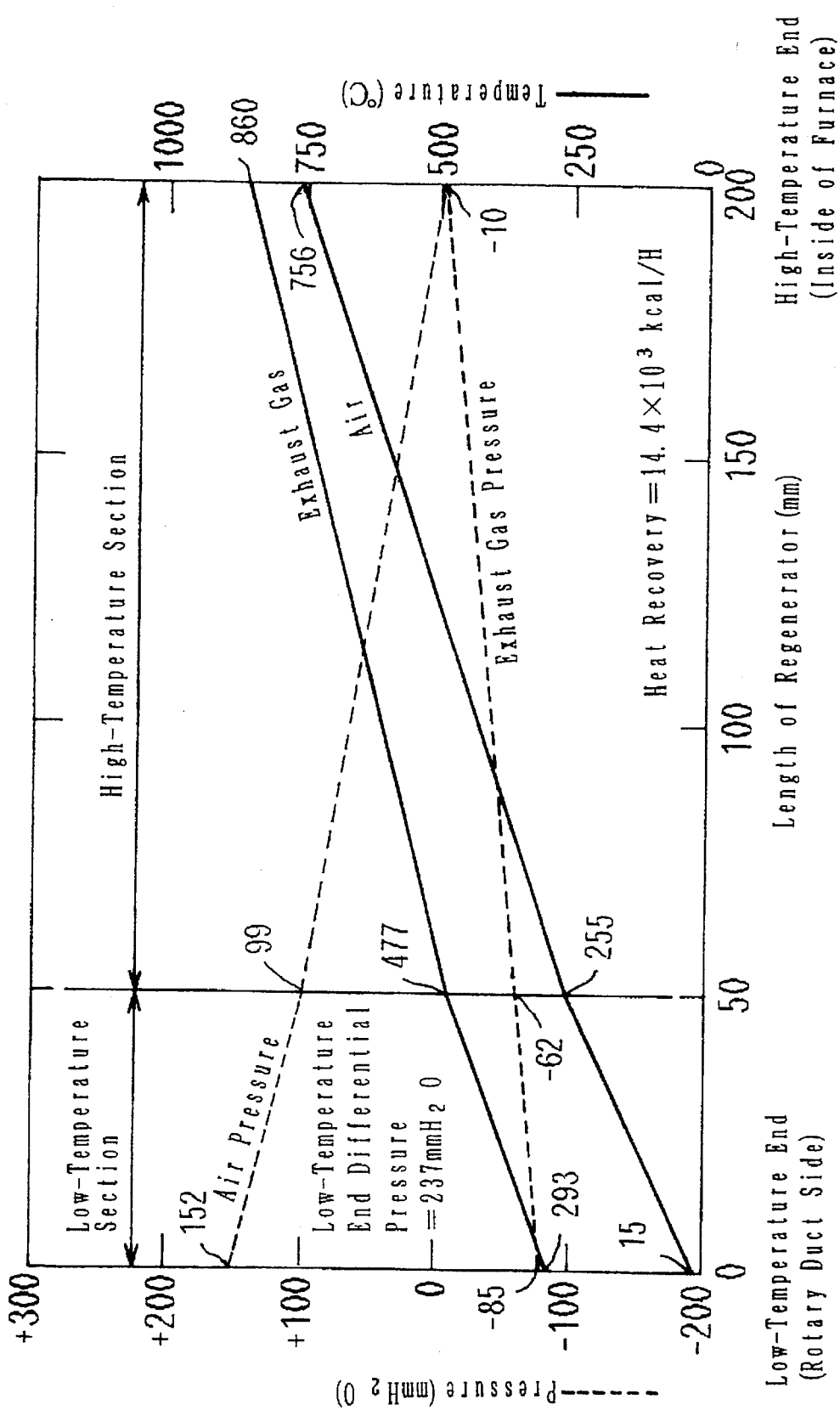
FIG. 5 is a graphical representation showing a variation of each of an air pressure, an exhaust gas pressure, an air temperature and an exhaust gas temperature in another regenerator which may be incorporated in the heat exchanger shown in FIG. 1, which variation was obtained by calculation.

A material for the low-temperature section is not limited to metal. Theoretical calculation was made on the regenerative unit 9 for the low-temperature section made of a ceramic material under the same conditions as described above. The generative unit 9 used was formed of cordierite into dimensions of 144 mm in outer diameter thereof, 90 mm in effective inner diameter thereof, 50 mm in length thereof in an axial direction thereof and 1.45 mm in equivalent diameter of the through-holes. The through-holes formed were 3,900 in number. Results of the calculation were as shown in FIG. 5. As will be noted from comparison between FIG. 5 and FIG. 6, the regenerator of the illustrated embodiment permits the low-temperature end differential pressure or pressure loss to be reduced by 52%, although it cause thermal recovery to be decreased by 6.3%.

As can be seen from FIGS. 4 and 6, use of a regenerative unit increased in pressure loss gradient as the low-temperature section of the regenerator permits effectiveness of heat exchange in the low-temperature section to be increased while keeping the low-temperature end differential pressure at an appropriate level. Also, it permits a length of the whole regenerator in an axial direction thereof to be reduced.

In the embodiment described above, the high-temperature section comprises a regenerative unit made of a ceramic material. Alternatively, when a furnace temperature can be limited to a low level, the high-temperature section may be constituted by a regenerative unit made of a metal material. In this instance, the low-temperature section may be made of a ceramic material or a metal material.

Also, in the embodiment described above, the high-temperature section and low-temperature section each comprise a single regenerative unit. Alternatively, the sections each may comprise a combination of a plurality of regenerative units.

Further, the above-described embodiment is so constructed that the high-temperature section and low-temperature section are constituted by regenerative units separate from each other, respectively. Alternatively, both sections are commonly constituted by a single regenerative unit integrally formed, wherein a part of the through-holes is partially varied in diameter using suitable techniques such as coating or the like, to thereby permit the high-temperature section and low-temperature section to be different in pressure loss gradient from each other. Such an integrated regenerative unit may be formed by preparing a regenerative element formed with a plurality of through-holes of the same configuration and then dipping one end of the regenerative element in a liquid coating material to form a coated layer in the through-holes, to thereby vary a sectional configuration of the through-holes and a size thereof. The integrally formed regenerative unit may be made of a ceramic material or a metal material. Such coating techniques may be conveniently applied to the case that the low-temperature section and high-temperature section which exhibit desired pressure loss gradients different from each other are formed in a manner to be independent from each other. Formation of such a coated layer in the regenerator made of a metal material leads to an increase in corrosion resistance of the regenerator. Formation of such a coated layer in the regenerator made of a laminate of ceramic paper sheets permits the regenerator to be increased in mechanical strength.

The embodiment described above includes a combination of the regenerator and burner nozzle. Alternatively, the regenerator and burner nozzle may be provided separately from each other. In this instance, the regenerator may be rotated while keeping the air duct of the suction/exhaust duct structure stationary. Alternatively, both the regenerator and air duct may be rotated.

In addition, the above-described embodiment is so constructed that the bellows 34 is arranged at the open end of the air duct 24. Alternatively, the bellows 34 may be constructed so as to form a part of the air duct 24.

The embodiment described above is in the form of a rotary heat exchanger for a combustion apparatus, however, the present invention may be embodied in any suitable form other than the above-described embodiment.

Figure 7:
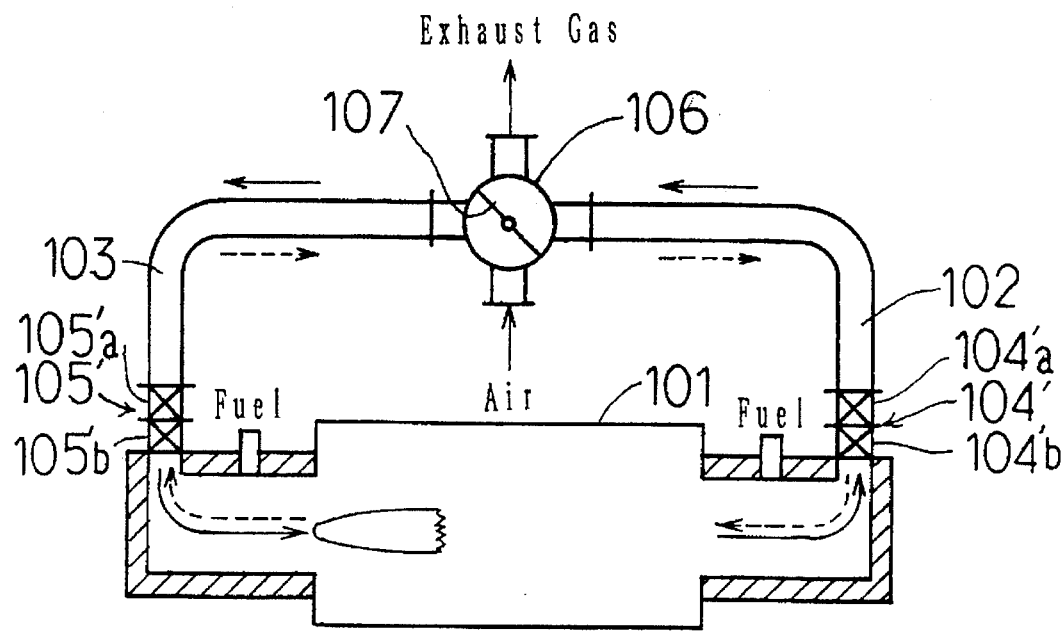
FIG. 7 is a schematic sectional view showing another embodiment of a heat exchanger for a combustion apparatus according to the present invention which is in the form of a non-rotary heat exchanger.
Figure 8:
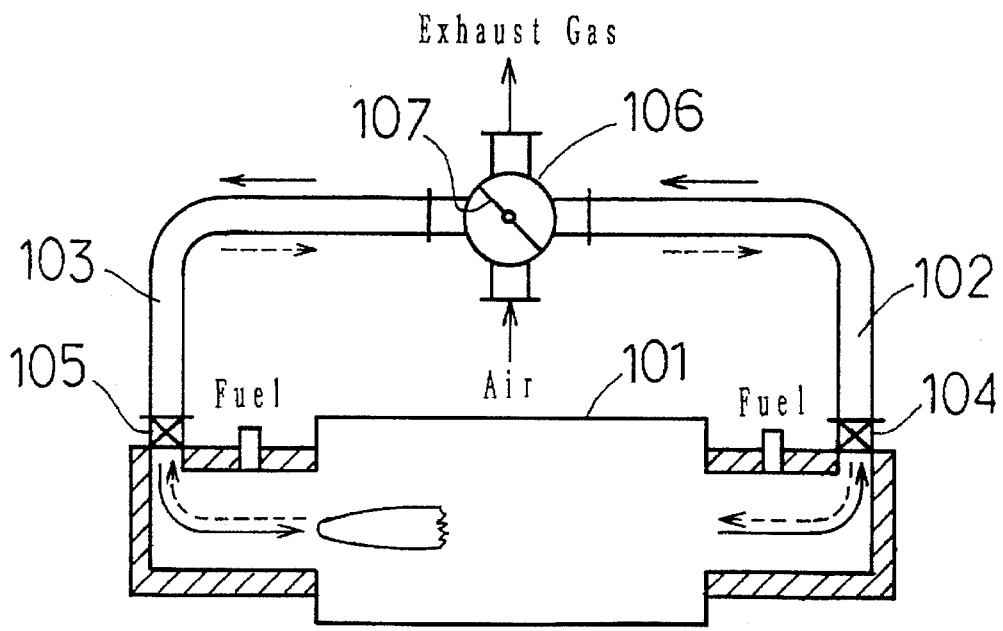
FIG. 8 is a schematic sectional view showing a conventional non-rotary heat exchanger for a combustion apparatus.

Referring now to FIG. 7, another embodiment of a heat exchanger for a combustion apparatus according to the present invention is illustrated which is in the form of a non-rotary heat exchanger. A non-rotary heat exchanger of the illustrated embodiment includes regenerators 104' and 105'. The regenerators 104' and 105' are so constructed that low-temperature sections 104'a and 105'a positioned on the side of a suction/exhaust ducts or ducts 102 and 103 are increased in pressure loss gradient as compared with high-temperature sections 104'b and 105'b located on the side of a combustion chamber 101. The regenerators including the low-temperature sections 104'a and 105'a and low-temperature sections 104'b and 105b' may be formed in substantially the same manner as the regenerator 8 of the above-described embodiment.

When air flows through the duct 102, a differential pressure or a difference in pressure between an air pressure on the side of an inlet of the regenerator 104' and an exhaust gas pressure on the side of an outlet of the regenerator 105' is applied to a valve body. The differential pressure is the same as the low-temperature end differential pressure in the rotary heat exchanger of the above-described embodiment. An increase in low-temperature end differential pressure leads to an increase in air leakage, although it permits an increase in heat recovery and effectiveness of the regenerators. In this instance, construction of the regenerators in the manner that a pressure loss gradient in the low-temperature sections 104'a and 105'a on the side of the suction/exhaust ducts is increased as compared with that in the high-temperature sections 104'b and 105'b on the side of the combustion chamber permits the low-temperature end differential pressure to be substantially decreased, although it leads to a slight decrease in heat recovery. This results in a valve body 107 of a reversing valve 106 which has the low-temperature end differential pressure applied thereto being reduced in driving force and minimizing air leakage from the reversing valve 106. Thus, it will be noted that the illustrated embodiment reduces the low-temperature end differential pressure while minimizing a decrease in effectiveness of the regenerators, to thereby exhibit improved seal performance and reduce driving force for the reversing valve.

In the illustrated embodiment, the regenerators may be arranged between the combustion chamber and the suction/exhaust ducts or in the middle of the suction/exhaust ducts. Also, the illustrated embodiment has a single four-direction reversing valve incorporated therein. Alternatively, four unidirectional reversing valves may be substituted for the four-direction reversing valve, to thereby change over or reverse the suction/exhaust ducts.

As can be seen from the foregoing, the present invention is constructed so as to permit a pressure loss gradient in the low-temperature section of the regenerator to be increased as compared with that in the high-temperature section defined on the side of the combustion chamber. Such construction reduces the low-temperature end differential pressure while keeping a whole dimension of the regenerator unvaried, to thereby improve seal performance of the regenerator.

In particular, when the low-temperature section and high-temperature section of the regenerator are formed separately from each other, it is possible to replace only the high-temperature section which is deteriorated in durability due to exposure to an elevated temperature as compared with the low-temperature section, to thereby facilitate repairing and maintenance of the regenerator. Also, this eliminates a necessity of readjusting alignment between the regenerative structure and the seal structure during the replacement.

Further, when the high-temperature section is made of a ceramic material, the regenerator is increased in durability. Also, when the low-temperature section of the rotary heat exchanger is made of a metal material and the seal member of the seal structure is likewise made of a metal material, the seal member is reduced in wearing.

Moreover, when the low-temperature section is formed by winding a laminate of flat strip-like steel plates or ceramic paper sheets and corrugated strip-like steel plates or ceramic paper sheets, suitable selection of a thickness of the steel plates or ceramic paper sheets and both a Ditch of corrugation of the corrugated strip-like steel plates or ceramic paper sheets and a height thereof permits a regenerator having desired meshes, a desired ratio of formation of the through-holes and a desired pressure loss gradient to be readily provided. Also, this readily provides the regenerator with a desired diameter by merely varying the number of windings.

Furthermore, when the present invention is applied to a rotary heat exchanger for a combustion apparatus, the seal member biasing mechanism for biasing the seal member provided at the open end of the oxidizing agent duct toward the regenerator may comprise a bellows exhibiting elasticity and flexibility in an axial direction of the air duct. Such construction, when an axis of the regenerative structure and that of the oxidizing duct fail to be rendered parallel to each other due to an error occurring during assembling of the heat exchanger, the error can be absorbed by deformation of the bellows or deflection and contraction of the bellows. Also, when the seal member is decreased in thickness due to wearing, the bellows extends in an axial direction thereof to displace the seal member toward the regenerative structure, to thereby minimize a deterioration in seal performance of the seal member due to a decrease in thickness thereof.

In addition, when the present invention is applied to a non-rotary heat exchanger, it is increased in seal characteristics and decreased in driving force for the reversing valve.

While preferred embodiments of the invention have been described with a certain degree of particularity with reference to the drawings, obvious modifications and variations are possible in light of the above teachings. It is therefore to be understood that with the scope of the appended claims, the invention may be practiced otherwise than as specifically described.

What is claimed is:

1. A heat exchanger for a combustion apparatus, comprising:
   a combustion chamber;
   suction/exhaust ducts; and
   an air-pervious regenerator arranged between said combustion chamber and said suction/exhaust ducts or in said suction/exhaust ducts to permit said combustion chamber and suction/exhaust ducts to communicate with each other therethrough;
   said regenerator including a low-temperature section positioned on the side of said suction/exhaust ducts and a high-temperature section positioned on the side of said combustion chamber;
   said regenerator being constructed so as to permit said low-temperature section to be increased in pressure loss gradient as compared with said high-temperature section.

2. A heat exchanger as defined in claim 1, wherein said low-temperature section and high-temperature section are formed separately from each other.

3. A heat exchanger as defined in claim 2, wherein said high-temperature section is made of a ceramic material and said low-temperature section is made of a metal material.

4. A heat exchanger as defined in claim 3, wherein said high-temperature section is formed by calcining a green regenerator element made by winding a laminate of flat strip-like ceramic paper sheets and corrugated strip-like ceramic paper sheets.

5. A heat exchanger as defined in claim 3 or 4, wherein said low-temperature section is formed by winding a laminate of flat plate-like steel plates and corrugated strip-like steel plates.

6. A heat exchanger as defined in claim 1 or 2, wherein at least one of said high-temperature section and low-temperature section is formed by winding a laminate of flat strip-like steel plates and corrugated strip-like steel plates.

7. A heat exchanger as defined in claim 1 or 2, wherein at least one of said high-temperature section and low-temperature section is formed by calcining a green regenerator element made by winding a laminate of flat strip-like ceramic paper sheets and corrugated strip-like ceramic paper sheets.

8. A heat exchanger as defined in claim 1, wherein said regenerator comprises a ceramic regenerator made of a ceramic material and formed with a plurality of through-holes which provide said regenerator with air perviousness;
   said through-holes of said ceramic regenerator being formed on a portion thereof corresponding to said low-temperature section with a coated layer.

9. A heat exchanger as defined in claim 8, wherein said ceramic regenerator is formed by calcining a green regenerator element made by winding a laminate of flat strip-like ceramic paper sheets and corrugated strip-like ceramic paper sheets.

10. A heat exchanger as defined in claim 1, wherein said regenerator is formed therein with a plurality of communication passages which permit said combustion chamber and suction/exhaust ducts to communicate with each other;
    said low-temperature of said regenerator is positioned on the side of said suction/exhaust ducts and formed therein with a plurality of through-holes constituting a part of said communication passages; and
    said high-temperature section is positioned on the side of said combustion chamber and formed therein with a plurality of through-holes constituting a part of said communication passages; and
    said through-holes of said low-temperature section and high-temperature section being so formed that said low-temperature section is increased in pressure loss gradient as compared with said high-temperature section.

11. A heat exchanger for a combustion apparatus, comprising:

a suction/exhaust duct structure including an oxidizing agent duct arranged so as to surround an oxidizing agent passage for guiding an oxidizing agent to a combustion chamber and an exhaust duct arranged so as to surround an exhaust passage for guiding exhaust gas discharged from said combustion chamber;

a regenerative structure including an air-pervious regenerator which permits said combustion chamber and said oxidizing agent passage and exhaust passage of said suction/exhaust duct structure to communicate with each other and mounted on a wall defining said combustion chamber;

a seal structure including a seal member and arranged between an open end of said oxidizing agent duct of said suction/exhaust duct structure and said regenerative structure to restrain air leakage from said oxidizing agent passage to said exhaust passage;

a rotation mechanism for driving at least one of said suction/exhaust duct structure and regenerative structure to cause relative rotary motion between said oxidizing agent passage and exhaust passage of said suction/exhaust duct structure and said regenerative structure;

said regenerator including a low-temperature section positioned on the side of said suction/exhaust duct structure and a high-temperature positioned on the side of said combustion chamber and being constructed so as to permit said low-temperature section to be increased in pressure loss gradient as compared with said high-temperature section.

12. A heat exchanger as defined in claim 11, wherein said high-temperature section is made of a ceramic material;

said low-temperature section is made of a metal material; and said seal member is made of a metal material.

13. A heat exchanger as defined in claim 11 or 12, wherein said oxidizing agent duct is provided at said open end thereof with a seal member biasing mechanism for biasing said seal member of said seal structure toward said regenerator;

said seal member biasing mechanism comprising a bellow exhibiting elasticity in an axial direction of said air duct.

14. A heat exchanger as defined in claim 13, wherein said oxidizing agent duct partially comprises a bellow exhibiting flexibility and elasticity in an axial direction of said oxidizing agent duct;

said bellow biasing said seal member toward said regenerator.

15. A heat exchanger as defined in claim 11, wherein said regenerator is formed at a central portion thereof with a though-hole into which a distal end of a burner nozzle is inserted.

16. A heat exchanger for a combustion apparatus, comprising:

a suction/exhaust duct structure including an oxidizing agent duct arranged so as to surround an oxidizing agent passage for guiding an oxidizing agent to a combustion chamber and an exhaust duct arranged so as to surround an exhaust passage for guiding exhaust gas discharged from said combustion chamber;

a regenerative structure including an air-pervious regenerator formed therein with a plurality of communication passages which permit said combustion chamber and said oxidizing agent passage and exhaust passage of said suction/exhaust duct structure to communicate with each other and mounted on a wall defining said combustion chamber;

a rotation mechanism for driving at least one of said suction/exhaust duct structure and regenerative structure to cause relative rotary motion between said oxidizing agent passage and exhaust passage of said suction/exhaust duct structure and said regenerative structure;

said regenerator including a low-temperature section arranged on the side of said suction/exhaust duct structure and formed therein with a plurality of through-holes constituting a part of said communication passages and a high-temperature section arranged on the side of said combustion chamber and formed therein with a plurality of the through-holes constituting a part of said communication passages;

the number of said through-holes of said low-temperature and high-temperature sections and an equivalent diameter thereof being determined so as to permit a pressure loss gradient in said low-temperature section to be larger than that in said high-temperature section.

17. A heat exchanger for a combustion apparatus, comprising:

at least one reversing valve;

two suction/exhaust ducts for alternately carrying out feed of an oxidizing agent and discharge of exhaust gas by reversing operation of said reversing valve; and a regenerator arranged between each of said suction/exhaust ducts and a combustion chamber or in each of said suction/exhaust ducts;

said regenerators each including a low-temperature section arranged on the side of said suction/exhaust ducts and a high-temperature section arranged on the side of said combustion chamber and being constructed so as to permit a pressure loss gradient in said low-temperature section to be larger than that in said high-temperature section.

18. A regenerator for a heat exchanger, comprising:

a regenerator body arranged between a combustion chamber and suction/exhaust ducts or in said suction/exhaust ducts and exhibiting air perviousness sufficient to permit said combustion chamber and section/exhaust ducts to communicate with each other through said regenerator body;

said regenerator body including a low-temperature section arranged on the side of said suction/exhaust ducts and a high-temperature section arranged on the side of said combustion chamber and being constructed so as to permit a pressure loss gradient in said low-temperature section to be larger than that in said high-temperature section.

19. A regenerator as defined in claim 18, wherein said regenerator body is formed therein with a plurality of communication passages which permit said combustion chamber and suction/exhaust ducts to communicate with each other therethrough;

said low-temperature section being formed with a plurality of through-holes constituting a part of said communication passages and said high-temperature section being formed with a plurality of through-holes constituting a part of said communication passages;

the number of said through-holes of said low-temperature and high-temperature sections and an equivalent diameter thereof being determined so as to permit a pressure loss gradient in said low-temperature section to be larger than that in said high-temperature section.

20. A method for preheating an oxidizing agent for combustion comprising the steps of:

arranging an air-pervious regenerative structure between a combustion chamber and oxidizing agent and exhaust passages of a suction/exhaust duct structure so as to permit both to communicate with each other therethrough; and driving at least one of said suction/exhaust duct structure and regenerative structure while restraining air leakage from said oxidizing passage to said exhaust passage by means of a seal structure to cause relative rotary motion between said air passage and exhaust passage of said suction/exhaust duct structure and said regenerative structure, to thereby heat said regenerative structure by exhaust gas discharged from said combustion chamber, resulting in preheating an oxidizing agent fed to said combustion chamber;

said regenerative structure including a low-temperature section positioned on the side of said suction/exhaust duct structure and a high-temperature section positioned on the side of said combustion chamber and being constructed so as to permit said low-temperature section to be increased in pressure loss gradient as compared with said high-temperature section.

* * * * *